Figure 1:
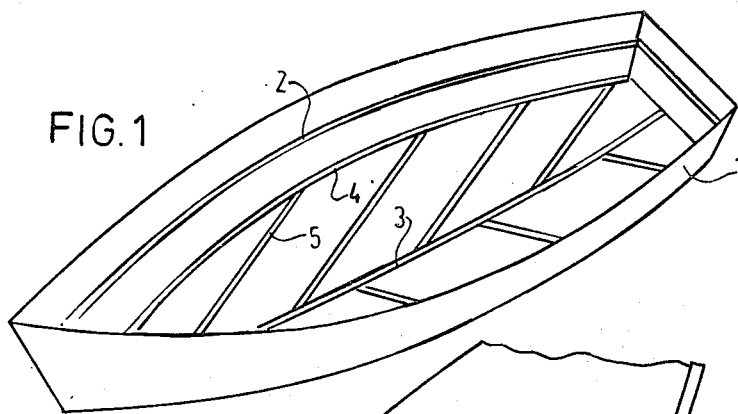

United States Patent [19]

Pott

[11] 4,405,669

[45] Sep. 20, 1983

[54] LAMINATE REINFORCEMENT FOR FIBRE-REINFORCED SYNTHETIC RESINS

[75] Inventor: Richard Pott, Lage, Fed. Rep. of Germany

[73] Assignee: Koninklijke Textielfabrieken Nijverdal-Ten Cate N.V., Almelo, Netherlands

[21] Appl. No.: 300,109

[22] Filed: Sep. 8, 1981

[51] Int. Cl.³ .............................................. B32B 3/00
[52] U.S. Cl. ............................... 428/61; 24/205.16 R; 139/384 R; 428/77; 428/101; 428/188; 428/192; 428/193; 428/222; 428/246; 428/257
[58] Field of Search ...................... 428/36, 68, 76, 101, 428/178, 188, 257, 258, 259, 294, 223, 222, 224, 192, 193, 246, 61, 77; 24/205.16 R; 139/384 R, 384 B

[56] References Cited

U.S. PATENT DOCUMENTS

| | | | |
|---|---|---|---|
| 3,900,659 | 8/1975 | MacBean | 428/223 |
| 3,978,255 | 8/1976 | Smith | 428/77 |
| 4,103,055 | 7/1978 | Levy | 428/259 |
| 4,231,139 | 11/1980 | Tsubata | 428/257 |

FOREIGN PATENT DOCUMENTS 757707 10/1970 Belgium .............................. 428/258

Primary Examiner—James J. Bell
Attorney, Agent, or Firm—Diller, Ramik & Wight

[57] ABSTRACT

The invention relates to a laminate reinforcement for fibre-reinforced sunthetic resins and has for its object to provide a laminate reinforcement of highly resistant and high elasticity modulus fibres for extremely heavy-duty, yet light-weight and indent-resistant floating bodies and provides to that purpose such a reinforcement in which the laminate reinforcement is obtained by means of at least two parallel tissue tapes forming by their tissue seams a paunch gap, which is covered with a similar, but narrower covering tape, doubling of the reinforcing fibres in the area of the paunch gap in parallel relationship producing a Stringer effect, in which the warp and weft yarns of the tissue tape are made from reinforcing fibres having a higher elasticity modulus and a higher specific tensile strength than glass fibres, said fibres consisting of carbon, aramid, boron fibres or the like, the warp yarns of carbon and aramid being in intimate contact with one another and the weft yarns of aramid or carbon being spaced apart in parallel relationship by a larger distance than the warp yarns.

9 Claims, 9 Drawing Figures

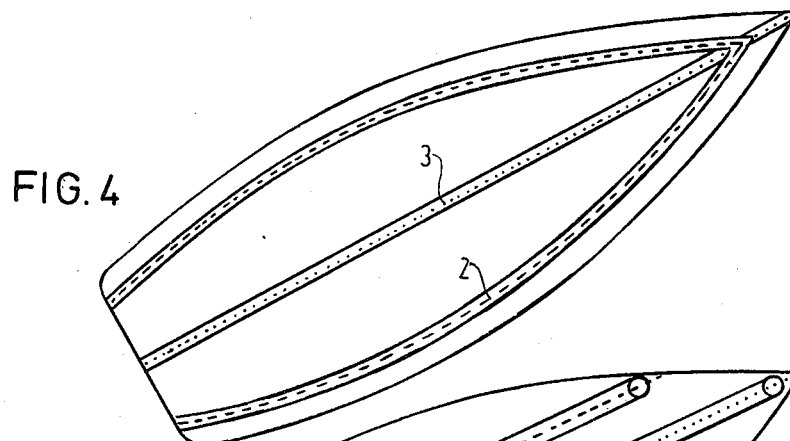
FIG. 4
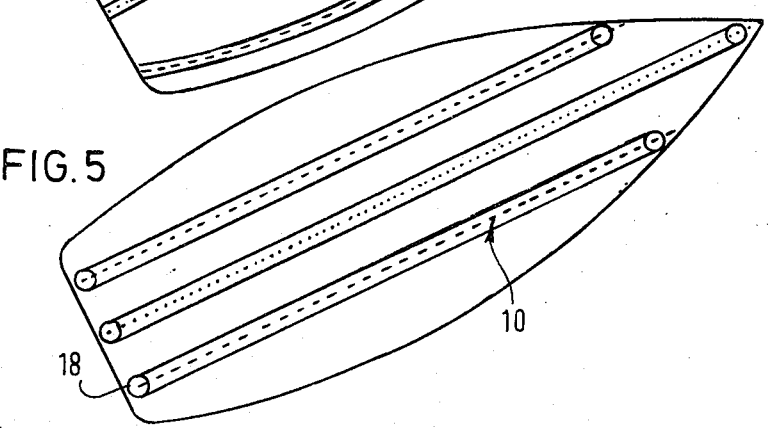
FIG. 5
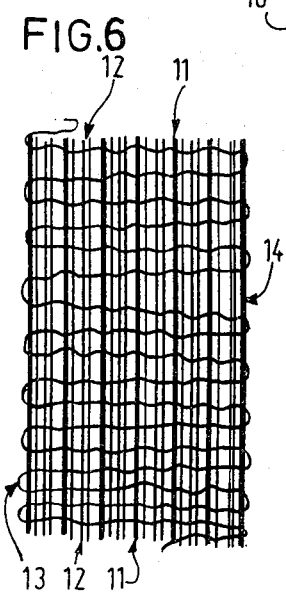
FIG. 6
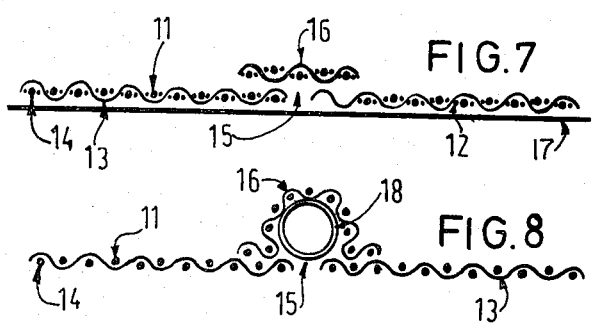
FIG. 7
FIG. 8
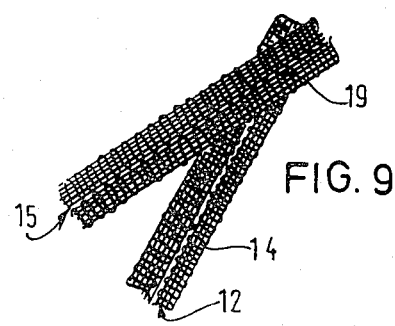
FIG. 9

LAMINATE REINFORCEMENT FOR FIBRE-REINFORCED SYNTHETIC RESINS

The invention relates to a laminate reinforcement for fibre-reinforced synthetic resins.

Laminate reinforcements for fibre-bonded basic materials are known per se. They are formed by tissues in the form of strips or tapes or by mats and coatings of different materials such as glass-, carbon- or aramid-fibres or combinations of said fibers. They are employed as matrices for reinforcing mechanically heavily loaded structural elements in conjunction with cold or hot curing synthetic resin systems of polyester, expoxy or polymide.

In order to obtain the high tensile strength and in particular the bending and indent resistance required for the floating bodies of sport boat constructions comparatively large wall thickness and hence heavy structural weights have to be accepted. A further possibility of satisfying the requirements of bending resistance resides in the so-called sandwich construction. For this purpose two laminate walls have to made with an intermediate layer of supporting material, for example, hard foam. If the outer laminate wall is damaged, when the vessel is operating, water will usually penetrate into the supporting foam of the intermediate layer. So far there has not been found a way of removing the absorbed water and residual moisture prior to making repairs. If a hole thus produced in nonetheless repaired, the structure of the material will be gradually further deteriorated due to temperature fluctuations and the consequent formation of ice crystals in winter.

Similar problems are involved in the use of supporting material in honeycomb form of aluminium or hard paper rather than the aforesaid hard foam. Therefore, the sandwich construction should, if at all, be employed only for parts above the deck of a vessel. In the region of the hull this construction has important disadvantages.

The present invention has for its object to provide a laminate reinforcement of highly resistant and high elasticity modulus fibres for extremely heavy-duty, yet light-weight and indent-resistant floating bodies.

The invention consists in that mainly in the plane of heaviest loads corresponding to the longitudinal axis in the case of a ship's hull only such an amount of unidirectionally orientated fibre material is employed as is required for absorbing static and dynamic forces, which is achieved in that tissue tapes of carbon fibre, aramid fibre or a combination of these fibres are used in a manner such that the carbon/aramid fibre strands as warp yarns are in intimate contact with one another whereas the weft yarns of one of these two materials are disposed at a larger distance than the warp yarns and at right angles to the latter for the absorption of transverse forces. In contrast to tissues in which woven, for example, like tweed, satin or linen bonds with a warp/weft ration of about 1:1 the woven tapes with their insignificant yarn crossings only little affecting the laminate rigidity have the highest reinforcing effect and at the same time a minimum weight. Since tissue tapes are located side by side at their edges and thus form paunch gaps, they have to be covered by narrow tissue at these gaps. Since these narrow tissues have a similar structure to the tissue tapes proper, whilst their width is, of course, reduced, they provide additional rigidity for the overall laminate structure, thus ensuring the Stringer effect, which is highly important for floating bodies and which in cooperation with the more rigid and solid fibres than glass fibres guarantees the required indent resistance, light weight and ruggedness.

The invention has furthermore for its object to ensure the Stringer effect by covering the paunch gaps between the neighbouring tissue tapes with a flexible synthetic resin tube, which is coated in an axial direction with a tissue tape, which forms a vault by means of the embedded synthetic tube and thus provides a high degree of resistance as a hollow body of statically negligible inner form.

According to a further aspect of the invention the paunch gaps providing the Stringer effect are positioned in the region of the vessel hull, surf board or the like in a manner such that they take effect exactly in the zones of the heaviest load. In the case of a ship's hull this is the overall region of the subaqueous part and the transitional area between hull and deck. In the region of the hull bottom the tissue tapes may be disposed at acute angles to the keel line, where the heavies torsional forces apply, whereas towards the sides of the hull the direction of the fibres may progressively become more parallel to the water line or the float line. It is furthermore possible to obtain laminate reinforcements by crosswise superposition of tissue tapes, for example, in order to obtain partially thickened parts for initial absorption of forces exerted by fastening construction parts or mountings.

Figure 2:
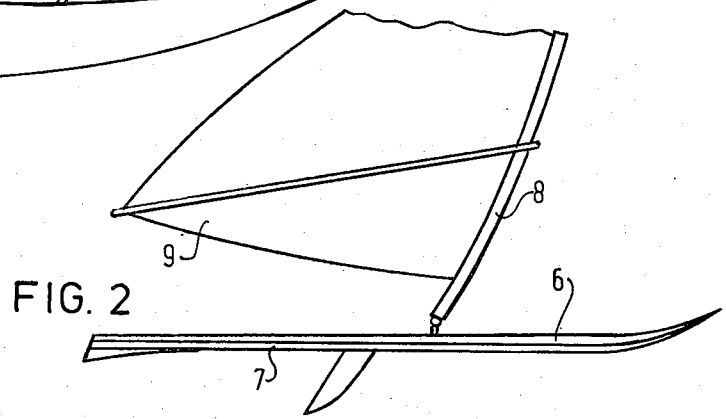
Figure 3:
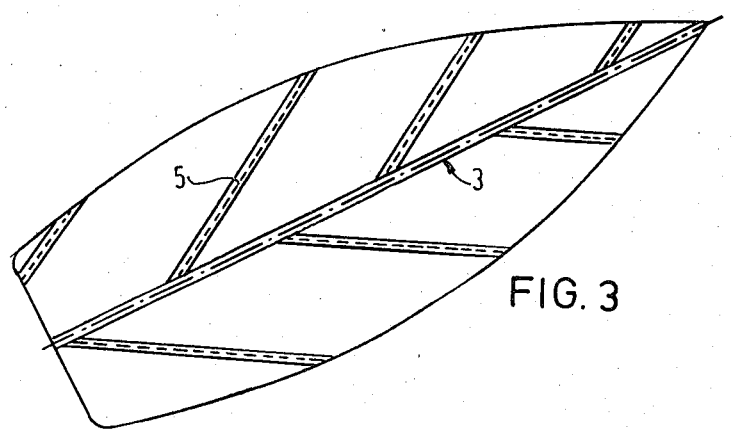

The drawings show embodiments of the invention in:

FIG. 1 an internal view of a boat hull showing the paunch gaps producing the Stringer effect;

FIG. 2 a surf board in a side elevation as a practical example;

FIG. 3 an internal view of a boat deck showing the paunch seams producing the Stringer effect;

FIG. 4 an inner shell of a hull showing the paunch seams producing the Stringer effect;

FIG. 5 an inner shell of a hull showing the paunch seam producing the Stringer effect and the superimposed, covered tube;

FIG. 6 a tissue tape with yarns of carbon fibre and aramid fibre in intimate contact with one another and a weft yarn at larger intervals than the warp yarns;

FIG. 7 a sectional view of the paunch seam producing the Stringer effect with covering tape;

FIG. 8 a sectional view of the paunch seam producing the Stringer effect with covering tape and embedded tube; and FIG. 9 a laminate reinforcement by multi-layer tissue tapes arranged at angles to one another.

FIG. 1 shows a floating body 1 constructed in the form of a ship's hull of the bent girder type with the paunch seams 2 producing the Stringer effect for the absorption of preferably the longitudinal bending forces 3, as keel Stringer 4 and 5 in a bond for the absorption of the longitudinal, transverse and torsional loads.

FIG. 2 shows a surf board as a floating body 6 with the adhesive junction seam between the upper and lower shell 7, the mast 8 and the sail 9.

FIGS. 3, 4 and 5 show embodiments of the invention showing the Stringer effect paunch rims 2, 3,4 and 5 and a variant with a covering tape and an inner tube 10. Positioning in the region of the synthetic resin laminate is chosen in accordance with the expected load of the structural part and relates to the angular arrangement of the Stringereffect paunch rims with respect to the main load axis, mainly the longitudinal axis and to the tissue tape width 13 and hence to the intervals between the paunch rims 15.

FIG. 6 shows a tissue tape with its narrowly contacting warp yarns, for example, of carbon fibres 11 and the aramid fibres 12 and with the weft yarns of aramid fibres further spaced apart than the warp yarns, in which the warp yarns 11 and 12 absorb the longitudinal forces and the weft yarns 13 the transverse forces, whilst the outermost warp yarns 14 form the tissue seams.

FIG. 7 shows a paunch rim producing the Stringer effect. The weft yarns 13 and the warp yarns 11 and 12 are apparent. The tape seams are formed by the warp yarns 14. The interstice between two intimately contacting tissue tapes 15 is covered by a narrower tissue tape 16 of the same kind so that in the area of the superimposition the material is doubled and hence the laminate is markedly stiffened and reinforced. Below the same a glass fibre skin 17 is preferably used for obtaining a smooth laminate surface.

FIG. 8 shows a paunch rim producing the Stringer effect, in which the interstice 15 is covered by an embedded tube 18. This tube, strengthening the Stringer effect as a hollow body, is covered by a tissue tape 16. As laminating resins cold or hot curing, multi-component resins on the basis of polyester, epoxy, phenol or polymide are used.

FIG. 9 shows a laminate reinforcement by a multi-layer arrangement of the above-mentioned tissue tapes, in which the paunch gaps are covered by an angular disposition of the single layers 19. In this way an overall reinforcement is obtained rather than a local reinforcement. Such a reinforcement requiring higher costs of material is preferably employed for construction parts exposed to heavy torsional forces.

I claim:

1. A laminate reinforcement in a fibre-reinforced synthetic resin, characterized in that the laminate reinforcement is obtained by means of at least two parallel tissue tapes forming by their tissue seams (14) a paunch gap (15), which is covered with a similar, but narrower covering tape (16) to provide doubling of the reinforcing fibres in the area of the paunch gap in parallel relationship producing a Stringer effect, in which the warp and weft yarns of the tissue tape are made from reinforcing fibres such as carbon, aramid, boron and like fibres having a higher elasticity modulus and a higher specific tensile strength than glass fibres, the warp yarns of carbon (11) and aramid (12) being closely spaced with one another and the weft yarns (13) being spaced apart in parallel relationship by a larger distance than the warp yarns (11) and (12).

2. A laminate reinforcement as claimed in claim 1, characterized in that the paunch gap (15) formed by the tissue seams (14) is covered by means of a flexible tube (18), which is again covered by the covering tape (16), which covers the tube and part of the tube contacting surface formed by the edges of the two tissue tapes so that the hollow space thus formed provides an increased Stringer effect.

3. A laminate reinforcement as claimed in claim 1, characterized in that the paunch gap (15) formed by the tissue seams (14) is covered with one or more layers of tissue tapes (16), the layers being arranged at angles to one another.

4. A fiber-reinforced synthetic resin article comprising at least two tissue tapes disposed in side-by-side but spaced parallel relation to define a gap therebetween, each tissue tape comprising a layer of warp fibers extending parallel to said gap and an undulating weft fiber woven back and forth across the layer of warp fibers to form the tape and in which the successive runs of the weft fiber are spaced apart by distances greater than the spacings between warp fibers, said fibers being made of material having a higher elasticity modulus and a higher specific tensile strength than glass fibers, and gap-reinforcing means for bridging said gap to provide a doubling of reinforcing fibers at the opposite sides of such gap, said gap-reinforcing means comprising at least one further tissue tape similar to said tapes first mentioned and having its warp fibers extending at least generally in the direction of the warp fibers of said first mentioned tapes.

5. A fiber-reinforced synthetic resin article as defined in claim 4 wherein said gap-reinforcing means comprises a length of tubing of flexible synthetic resinous material generally seated in said gap but having a cross-sectional width much greater than the width of said gap, and a further tissue tape draped over said tube and having its opposite marginal edge portions overlying the corresponding marginal edge portions of the tissue tapes defining said gap.

6. A fiber-reinforced synthetic resin article as defined in claim 4 wherein said gap-reinforcing means comprises at least one layer of further tissue tapes bridging said gap at an acute angle thereto.

7. A fiber-reinforced synthetic resin article as defined in claim 4 wherein said warp fibers are selected from the group consisting of carbon fibers, aramid fibers and mixtures thereof.

8. A fiber-reinforced synthetic resin article as defined in claim 5 wherein said warp fibers are selected from the group consisting of carbon fibers, aramid fibers and mixtures thereof.

9. A fiber-reinforced synthetic resin article as defined in claim 6 wherein said warp fibers are selected from the group consisting of carbon fibers, aramid fibers and mixtures thereof.

* * * * *

UNITED STATES PATENT AND TRADEMARK OFFICE
CERTIFICATE OF CORRECTION

PATENT NO. : 4,405,669

DATED : September 20, 1983

INVENTOR(S) : Richard Pott

It is certified that error appears in the above-identified patent and that said Letters Patent is hereby corrected as shown below:

On the title page Insert

--(30) Foreign Application Priority Data

Sept. 13, 1980 Fed. Rep. of Germany ..... 30 34661 --.

Signed and Sealed this

Eighth Day of November 1983

[SEAL]

Attest:

GERALD J. MOSSINGHOFF

Attesting Officer

Commissioner of Patents and Trademarks